W. F. H. BRAUN.
MEAT TABLE FOR SLICING MACHINES.
APPLICATION FILED MAY 24, 1921.

1,402,140.

Patented Jan. 3, 1922.
2 SHEETS—SHEET 1.

WITNESS:
Robt R Ritchel.

INVENTOR
William F. H. Braun
BY
Augustus B Stoughton
ATTORNEY.

UNITED STATES PATENT OFFICE.

WILLIAM F. H. BRAUN, OF PHILADELPHIA, PENNSYLVANIA, ASSIGNOR TO THE BRAUN COMPANY, OF PHILADELPHIA, PENNSYLVANIA, A CORPORATION OF PENNSYLVNIA.

MEAT TABLE FOR SLICING MACHINES.

1,402,140.   Specification of Letters Patent.   Patented Jan. 3, 1922.

Application filed May 24, 1921. Serial No. 472,209.

*To all whom it may concern:*

Be it known that I, WILLIAM F. H. BRAUN, a citizen of the United States, residing at Philadelphia, in the county of Philadelphia and State of Pennsylvania, have invented a new and useful Improvement in Meat Tables for Slicing Machines, of which the following is a specification.

The principal objects of the present invention are, first, to improve the construction and operation of the connections between the traveler and the meat carrier; second, to make the feed nut provision of the traveler so that it does not come off with the meat carrier when it is removed from the traveler; third, to facilitate the rapid retrograde movement of the meat carrier and the detachment of the latter from the machine; and fourth, to improve the guiding of the meat carrier on the traveler.

The invention will be claimed at the end hereof but will be first described in connection with the embodiment of it chosen from among other embodiments for illustration in the accompanying drawings forming part hereof and in which Figure 1 is a top or plan view of a meat table embodying features of the invention.

Figure 1:
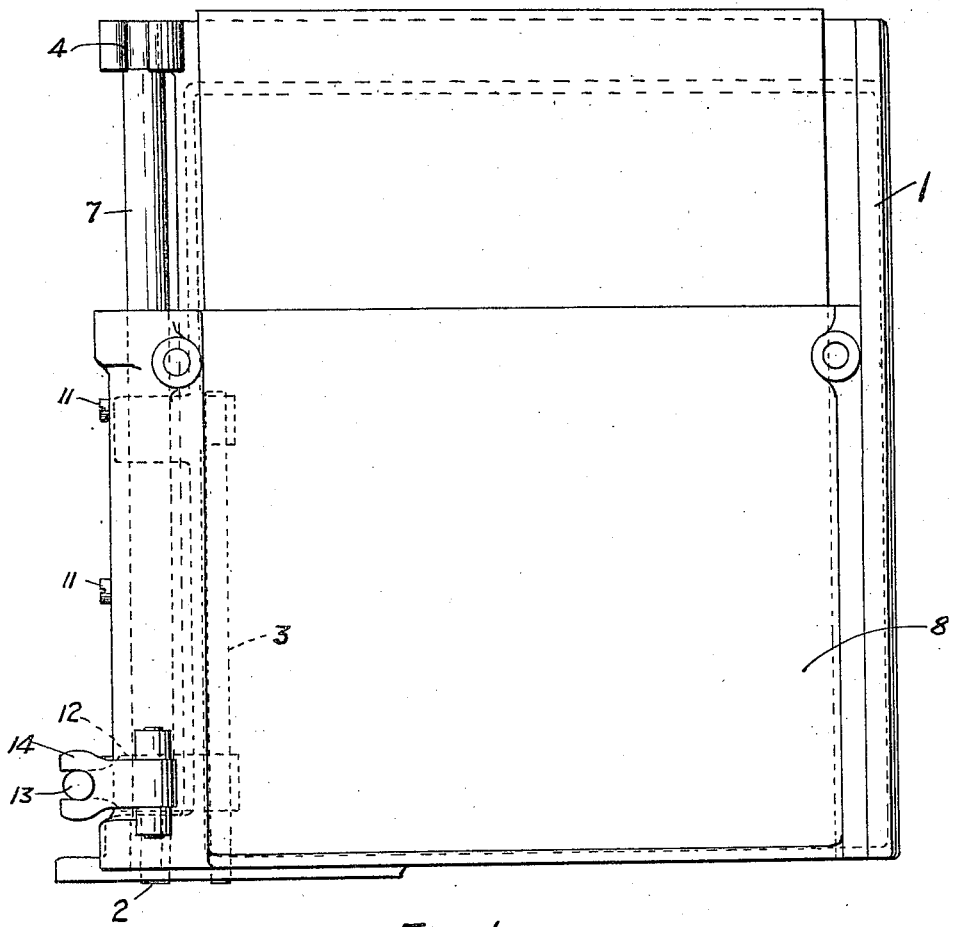
Figure 2:
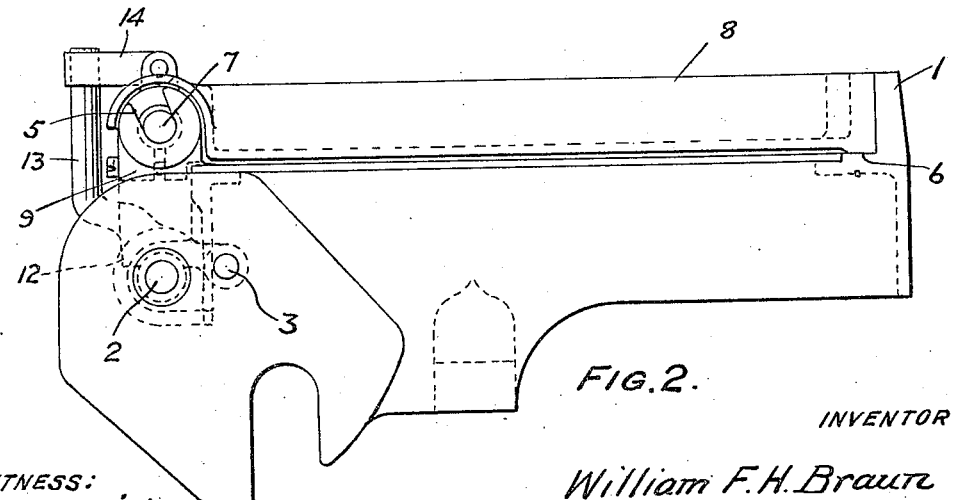
Fig. 2 is an end view of the same.
Figure 3:
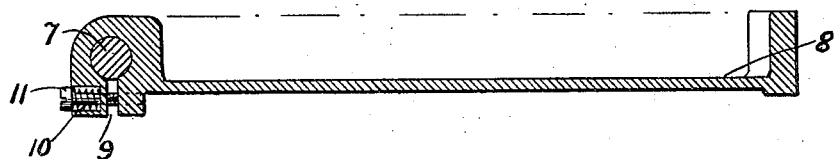
Fig. 3 is a cross-sectional view illustrative of the meat carrier.
Figure 4:
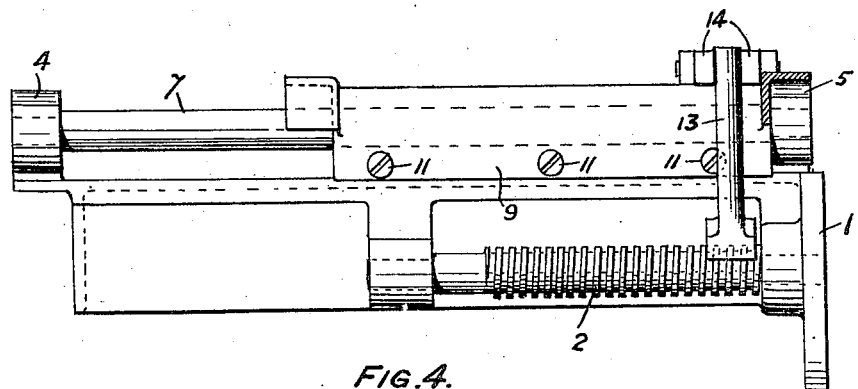
Fig. 4 is a view of the lefthand side of the machine shown in Fig. 1.
Figure 5:
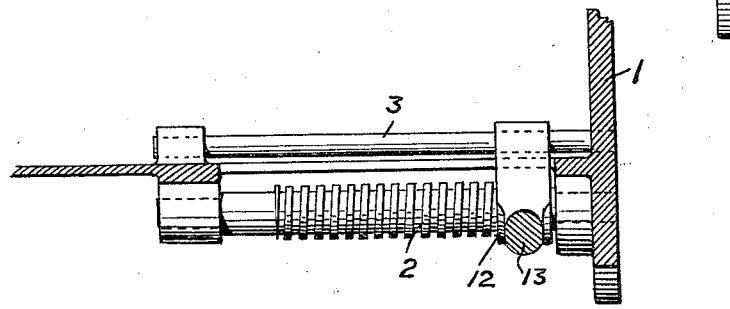
Fig. 5 is a horizontal sectional view showing the feed nut and its accessories.

In the drawings 1 is a traveler provided with a feed screw 2 and with a bar 3 arranged in parallelism. The traveler 1 is the element of a meat slicing machine which is reciprocated back and forth parallel with the plane of the knife and which is too well understood by those skilled in the art to require further description. The traveler 1 is also provided with notches 4 and 5, and with a way 6. 7 is a rod detachably applicable to the notches 4 and 5 for which purpose it is shown as provided with reduced ends. 8 is a meat carrier provided with a friction bearing 9 by which it engages and slides upon the rod 7 and the meat carrier also slides on the way 6. The friction bearing is shown as a split bearing of which the parts are urged toward each other by springs 10 mounted on screws 11. 12 is a segmental nut slidable and turnable on the bar 3 and provided with a projection or handle 13 by which it can be lifted into and out of engagement with the thread of the screw 2. 14 is a latch pivoted to the meat carrier and provided with a forked end adapted to engage and disengage the projection or handle 13.

In use the feed screw 2 is intermittently rotated in a manner and by means too well understood by those skilled in the art to require description. The nut 12 is driven by the screw and slides on the bar 3 toward the top of the sheet in Fig. 1. The latch 14 engaging the projection 13 on the nut causes the meat carrier to move with the nut and the meat carrier is guided by the rod 7 through the instrumentality of the friction bearing 9. To move the carrier 8 quickly in the other direction, the latch 14 is manipulated to permit the handle 13 to be availed of for lifting the nut clear of its screw. The meat carrier can be lifted freely from the traveler 1 without disturbing the feed nut, and the rod 7 comes off with the meat carrier but is not accidentally detachable therefrom on account of the friction bearing 9, yet the rod 7 can be detached from all parts of the machine which is a matter of considerable convenience in cleaning it.

It will be obvious to those skilled in the art that modifications may be made in details of construction, arrangement and form without departing from the spirit of the invention which is not limited to those matters or otherwise than as the prior art and the appended claims may require.

I claim:

1. In a meat table for slicing machines the combination of a traveler provided with notches and with a way, and a meat carrier detachably slidable on the way and provided with a rod on which it is slidably mounted and which rod is detachably applicable to the notches.

2. In a meat table for slicing machines the combination of a traveler provided with notches and with a way, a meat carrier detachably slidable on the way, a rod detachably applicable to the notches, and a friction bearing provided on the carrier and engaging the rod.

3. In a meat table for slicing machines the combination of a traveler provided with a feed screw and a bar arranged in parallelism, a meat carrier slidable on the traveler, a segmental nut slidable and turnable on the bar for engagement and disengagement with the feed screw, and latch means for connecting and disconnecting the nut and meat carrier.

WILLIAM F. H. BRAUN.